United States Patent
Le et al.

(10) Patent No.: US 11,210,448 B1
(45) Date of Patent: Dec. 28, 2021

(54) MITIGATING TIMING YIELD LOSS DUE TO HIGH-SIGMA RARE-EVENT PROCESS VARIATION

(71) Applicant: Synopsys, Inc., Mountain View, CA (US)

(72) Inventors: Kelvin Le, Mountain View, CA (US); Wenwen Chai, Mountain View, CA (US); Li Ding, Mountain View, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 17/150,980

(22) Filed: Jan. 15, 2021

Related U.S. Application Data

(60) Provisional application No. 62/962,044, filed on Jan. 16, 2020.

(51) Int. Cl.
*G06F 30/398* (2020.01)
*G06F 119/12* (2020.01)
*G06F 119/22* (2020.01)

(52) U.S. Cl.
CPC ........ *G06F 30/398* (2020.01); *G06F 2119/12* (2020.01); *G06F 2119/22* (2020.01)

(58) Field of Classification Search
CPC ..................................................... G06F 30/398
USPC ............................................................ 716/56
See application file for complete search history.

(56) References Cited

U.S. PATENT DOCUMENTS

2007/0226669 A1* 9/2007 Nitta .................... G06F 30/3312
716/103

* cited by examiner

*Primary Examiner* — Eric D Lee
(74) *Attorney, Agent, or Firm* — Weaver Austin Villeneuve & Sampson LLP

(57) ABSTRACT

Embodiments provide for mitigating parametric yield loss of an integrated circuit (IC) design. In certain embodiments, a delay distribution associated with at least one cell disposed in the design is determined. A pin slack distribution associated with paths in which the at least one cell is disposed is determined. A residual distribution is determined based at least in part on the delay distribution and the pin slack distribution. Yield loss associated with the at least one cell is determined based at least in part on the delay distribution and the residual distribution. When it is determined that that the yield loss associated with the at least one cell exceeds a yield loss threshold, the at least one cell may be identified as a candidate for replacement with a replacement cell.

20 Claims, 8 Drawing Sheets

MITIGATING TIMING YIELD LOSS DUE TO HIGH-SIGMA RARE-EVENT PROCESS VARIATION

RELATED APPLICATION

The present application claims priority to U.S. Provisional Application Ser. No. 62/926,044, titled "METHOD AND APPARATUS FOR COMPUTING TIMING YIELD LOSS DUE TO HIGH-SIGMA RARE-EVENT PROCESS VARIATION," filed Jan. 16, 2020, the contents of which are incorporated herein by reference in their entirety.

TECHNICAL FIELD

The present disclosure relates, generally, to integrated circuit design optimization and, more particularly, to mitigating timing yield loss due to high-sigma rare-event process variation.

BACKGROUND

With the rapid adoption of mobile devices, internet of things (IoT) and artificial intelligent devices, the demand for low power design continues to increase. To meet this increasing demand, operating voltages continue to decrease, thus causing significant increases in variations associated with fabrication processes and environments. Large variations in chip manufacturing pose major challenges in minimizing parametric yield loss caused by timing violations.

Moreover, the rise in transistor count of new generations of integrated circuits further increases the significance of handling yield loss caused by high-sigma rare events. Conventional process corner-based timing sign-off methodologies do not cover high-sigma rare local timing events and therefore fail to protect against timing yield loss. Statistical simulations such as Monte Carlo simulations are not effective in capturing such high-sigma rare events.

SUMMARY

Embodiments provide for mitigating parametric yield loss of an integrated circuit (IC) design. In certain embodiments, a delay distribution associated with at least one cell disposed in the design is determined. A pin slack distribution associated with paths in which the at least one cell is disposed is determined. A residual distribution is determined based at least in part on the delay distribution and the pin slack distribution. Yield loss associated with the at least one cell is determined based at least in part on the delay distribution and the residual distribution. When it is determined that that the yield loss associated with the at least one cell exceeds a yield loss threshold, the at least one cell may be identified as a candidate for replacement with a replacement cell. In embodiments, the replacement cell is associated with less parametric variation than the at least one cell.

In embodiments, determining the yield loss includes performing a convolution operation on the delay distribution and the residual distribution. In embodiments, determining the residual distribution includes subtracting a conjugate of the delay distribution from the pin slack distribution.

In embodiments, the delay distribution is a log-normal distribution and the residual distribution is a log-normal distribution.

In embodiments, an aggregated yield loss for the integrated circuit (IC) design is determined based at least on aggregating yield losses associated with each of multiple cells of the IC design.

In embodiments, yield loss for multiple cells of the integrated circuit (IC) design is determined and each cell of the multiple cells is ranked according to its associated yield loss in relation to other cells of the multiple cells.

In embodiments, a top N number of cells of the cells having higher yield loss in relation to other cells of the plurality of cells is identified. In embodiments, the top N number of cells are identified as candidates for replacement with replacement cells associated with less parametric variation than the top N number of cells.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
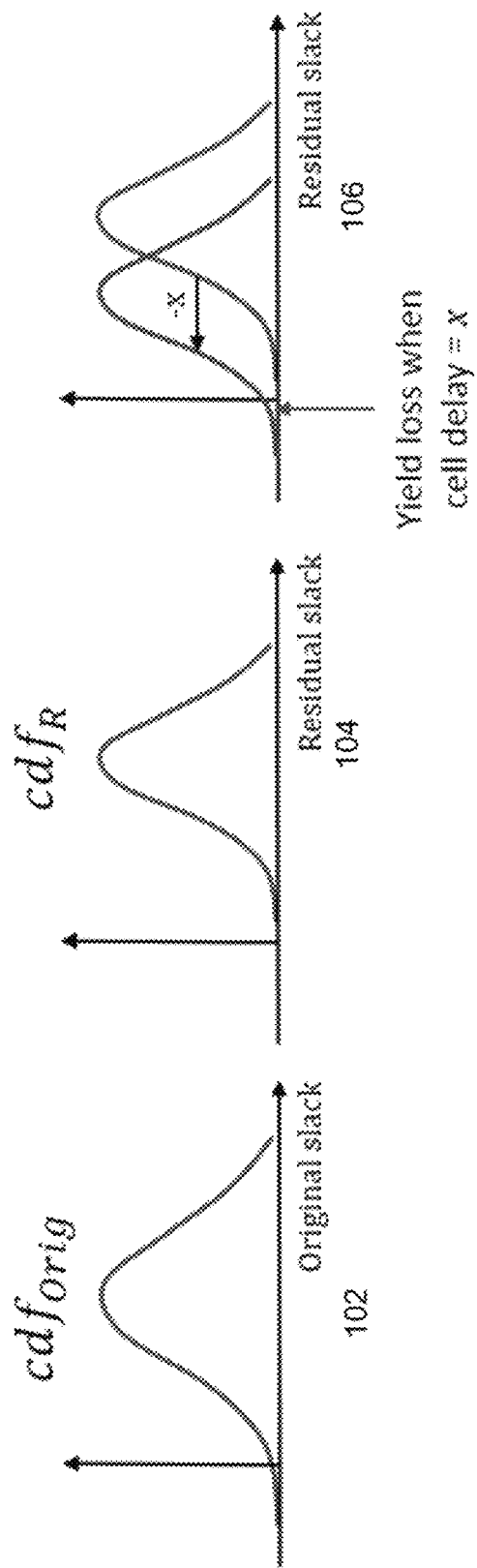
FIG. 1 illustrates exemplary comparison between original slack and residual slack, for use with some embodiments of the present disclosure.

Aspects of the present disclosure relate to mitigating timing yield loss due to high-sigma rare-event process variation. Embodiments of the present disclosure provide an more accurate estimate of cell yield loss (e.g., of a cell of an integrated circuit or IC) caused by high-sigma rare timing degradation of the cell, as well as the impact of the yield loss caused collectively by the cells in their paths. Yield refers to a measure of quality associated with a semiconductor (e.g., IC) process, where it represents a number of ICs that are not discarded for various reasons during the process. Yield loss may refer to a source that impacts final yield, such as a reason for an IC to function but not within desired specifications (e.g., parametric yield), or a reason for an IC not to function due to a particular defect. A sigma rating, associated with yield, may refer to within how many standard deviations of a normal distribution a fraction of defect-free (e.g., or desired performance) cells the yield corresponds.

Aspects of cell yield may include how much variation is associated with a given cell of an IC design (e.g., due to known device parameters and sensitivities to those parameters) as well as how much cell variation the design can tolerate before some sort of failure occurs. These aspects may be reflected as cell sigma, or the least amount of variation that causes a failure. Timing degradation occurs over time for cells of an IC due to aging of the underlying transistors. That is, process variation can contribute to degradation or aging of underlying transistors, and such process variation may lead to increased (e.g., rare or rare-event) degradation of timing performance for cells of an IC design. According to embodiments herein, cells associated with high-sigma rare timing degradation are identified and optimized.

Embodiments herein enable mitigation of yield loss by identifying cells for potential yield loss and enabling programmatic replacement of the cells (e.g., or other mitigating technique). In accordance with one aspect of the preset disclosure, yield loss related to high-sigma tail of the local cell delay distributions is computed. The yield loss is then accumulated over all the cells to provide an estimate of the full-chip yield loss. Hotspots (e.g., areas associated with high yield loss) identified are then used by an optimization engine for rectification.

When timing analysis is performed for a given integrated circuit (IC) design (e.g., also referred to herein as a design), the design is represented as a timing graph that is connected by timing arcs (edge of graph) and timing pins (node of graph). A single path from an input pin to an output pin of the timing graph is referred to as a timing path. In the timing graph, a cell delay is defined as the time it would take for a signal to travel from the input of the timing arc to the output of the timing arc. Path delay is defined as the time it would take for a signal to travel from a path input to a path output. Path slack is a measure of the timing margin the path has to ensure proper operation of the circuit. Pin slack refers to the worst path slack for all the paths that go through the pin. Cell delay, path delay, path slack, and pin slack and all other timing quantities have statistical distributions and may be modeled as random variables, as described further below.

FIG. 1 illustrates exemplary comparison between original slack distribution and residual slack distribution, for use with some embodiments of the present disclosure. In FIG. 1, a first curve 102 depicts original slack associated with a given cell, while a second curve 104 represents residual slack associated with the same cell. A third curve 106 depicts a comparison between the original slack and residual slack, as well as yield loss when the cell delay is x.

Figure 2:
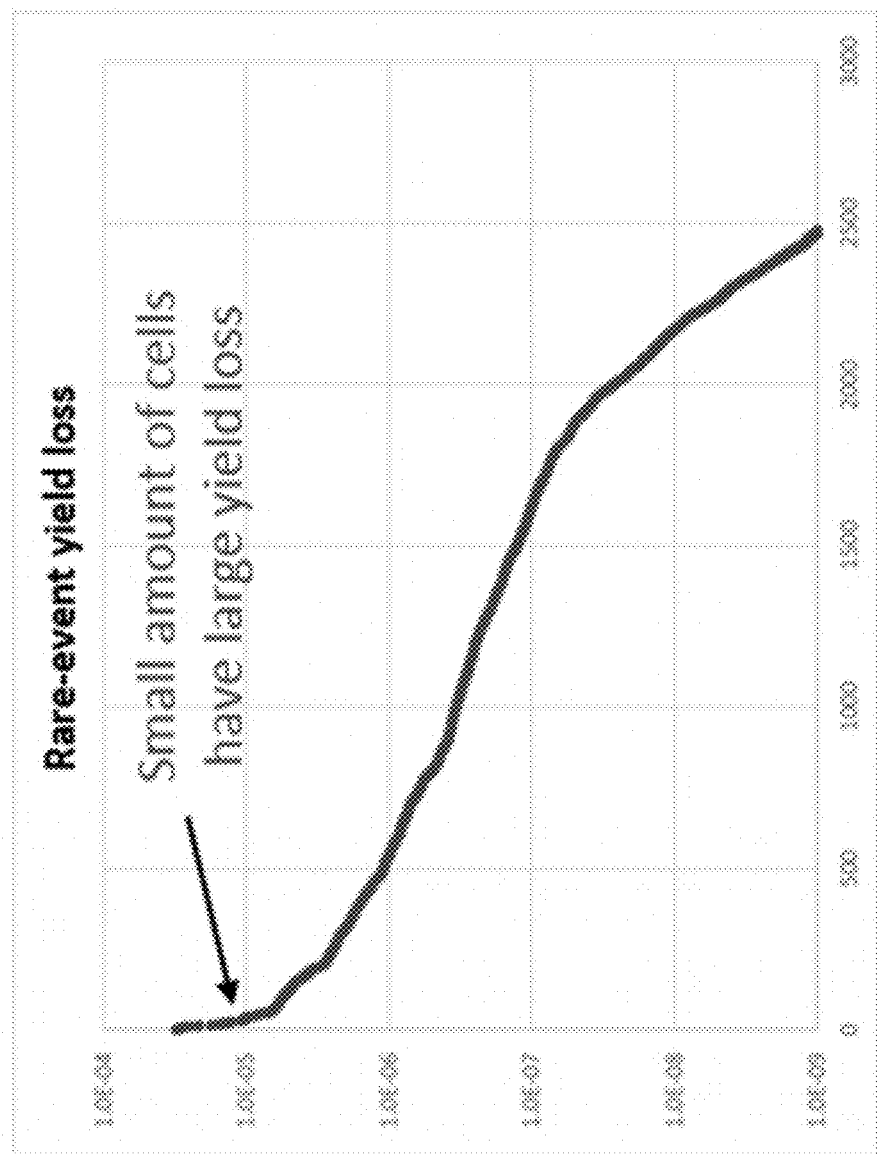
FIG. 2 illustrates exemplary rare-event yield loss in accordance with some embodiments of the present disclosure.

FIG. 2 illustrates exemplary rare-event yield loss in accordance with some embodiments of the present disclosure. Shown in FIG. 2, and depicted in example Table 1 below, a small number of cells of a design may be associated with high yield loss. Accordingly, replacing or otherwise optimizing those cells associated with high yield loss provides for significant improvements in yield for an overall design.

TABLE 1

|  | Number of Cells | Yield Loss |
| --- | --- | --- |
| Baseline | — | 0.257% |
| Fix cells > 1e−5 | 38 | 0.155% |
| Fix cells > 1e−6 | 539 | 0.043% |

Figure 3:
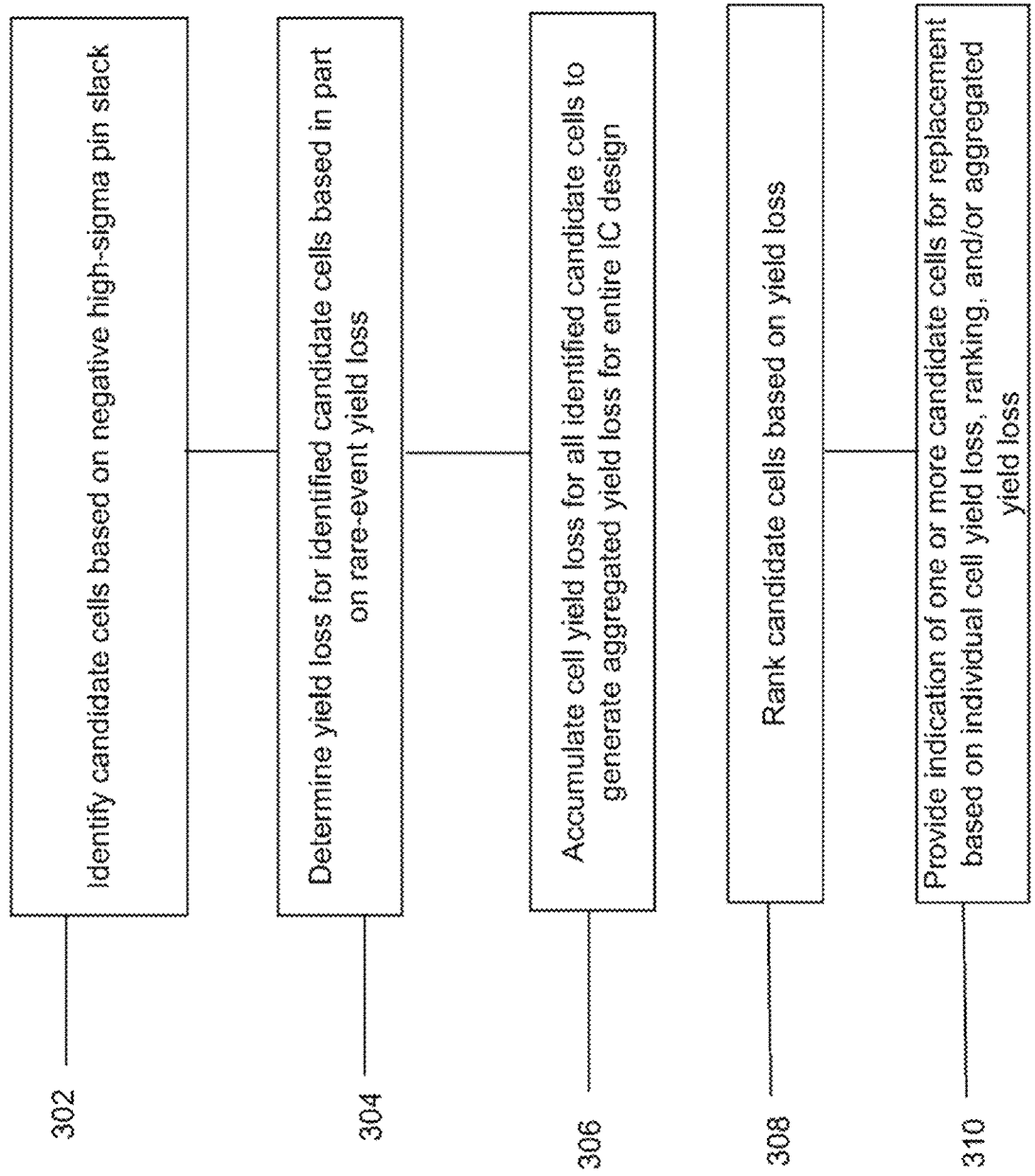
FIG. 3 depicts a flowchart of various processes used during yield optimization in accordance with some embodiments of the present disclosure.

FIG. 3 depicts a flowchart of various processes used during yield optimization in accordance with some embodiments of the present disclosure. That is, FIG. 3 represents various operations used in performing rare-event yield loss analysis and optimization in accordance with one embodiment of the present disclosure. As shown, yield loss analysis and optimization involve candidate cell identification, yield loss computation, and cell ranking for optimization. Cells with negative high-sigma (i.e., characterized by rare event) pin slacks are identified at 302. The yield loss caused by each such identified cells is determined 304. An aggregated yield loss for the full IC design is generated 306 based on accumulating (e.g., summing) the cell yield loss for all of the identified candidate cells. The identified candidate cells (e.g., at 302) are ranked at 308 according to the determined yield loss. One or more of the ranked cells may be identified (e.g., via an interface) and/or programmatically replaced at 310 using a yield optimization tool to mitigate their effect. That is, those cells ranking highest according to computed yield (e.g., a top N number of cells having the highest computed yield loss in relation to the other ranked cells) may be identified (e.g., via indication provided by way of an interface) for candidates for replacement by replacement cells. In other embodiments, those cells associated with a determined yield loss that does not meet a yield loss threshold may be identified for replacement.

In order to compute the yield loss due to rare-event cell delay degradation, a timing graph may be used to identify potential cells that may become yield hotspots (e.g., cells associated with high yield loss). In one embodiment, an asymmetric log-normal distribution is formed to determine the pin slack at a relatively high sigma point (e.g. six sigma). Such a slack distribution may be available for every cell of an IC design. If the corner slack is determined as being negative, the cell is selected as a candidate for rare event yield loss calculation (e.g., 302). The distribution may be constructed from moment data of the pin slack, which is the timing slack associated with the pin. An example of a timing slack distribution determination may be associated with equation (1) below.

$$\text{Slack}(k) = \text{Median}_{slack} - e^{\mu}(e^{-\sigma k} - 1) \qquad (1)$$

In the above equation (1), the slack associated with the $k^{th}$ delay may be a log-normal distribution, where $\mu$ and $\sigma$ are the mean and standard deviation of the logarithm of the slack distribution associated with the $k^{th}$ delay.

In embodiments, the cell delay distribution and pin slack distribution associated with any cell of an IC are obtained from a timing analysis. After both the delay distribution and slack distributions are determined for a cell, a residual slack distribution (e.g., defined as an updated slack distribution when the cell being considered has a fixed delay of zero) may be determined. The residual slack is thus the slack component from all other cells except the cell being considered.

In one embodiment when the distributions are defined by their moments, the residual slack distribution r may be computed based on a difference between the original slack distribution and the cell delay distribution. For example, the residual slack distribution may be represented according to equation (2) below.

$$r = s - d^* \qquad (2)$$

In equation (2), parameter "s" refers to the original slack distribution (which is the slack associated with the pin), parameter "d" refers to the cell delay distribution, which may be modeled with a lognormal distribution, and parameter "r" refers to the residual distribution of the slack from which the cell delay distribution impact is removed. The operator "*" in equation (2), may represent an exemplary conjugate operator.

Figure 4:
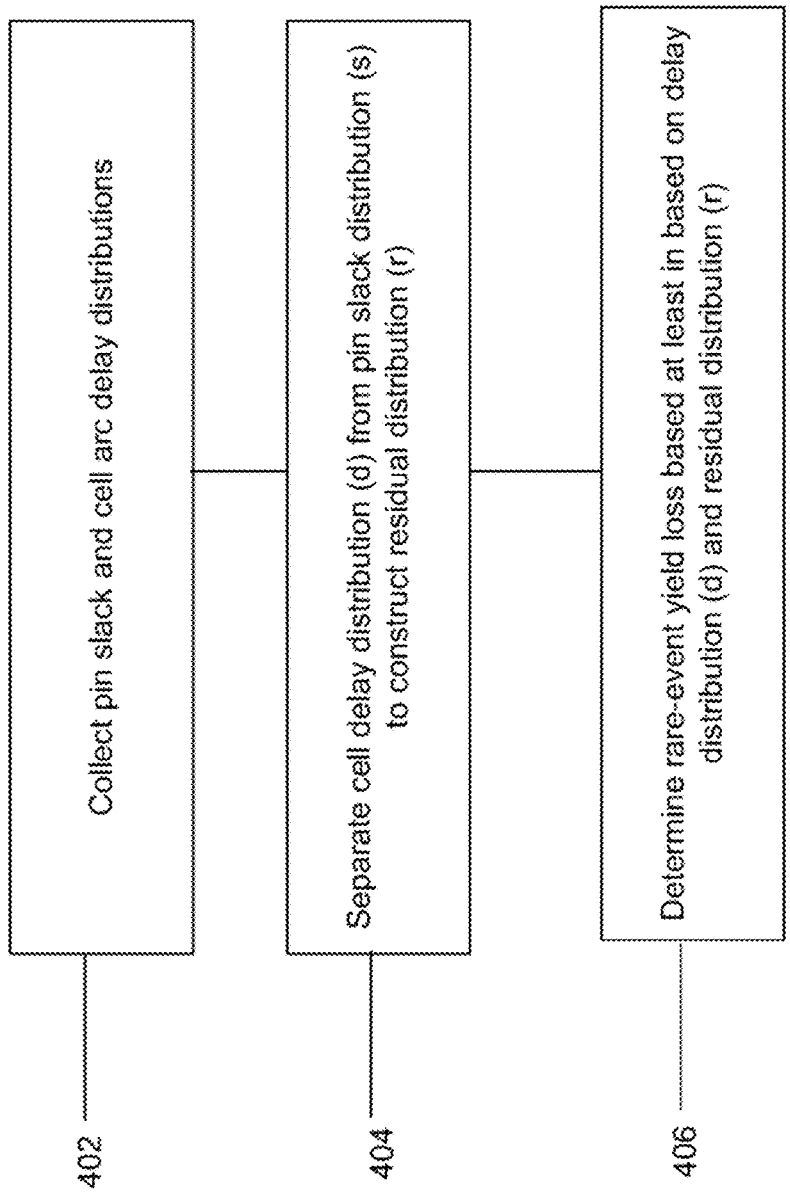
FIG. 4 depicts a flowchart of various processes used during yield optimization in accordance with some embodiments of the present disclosure.

FIG. 4 depicts a flowchart of various processes used during yield optimization in accordance with some embodiments of the present disclosure. That is, FIG. 4 provides a more detailed description of rare event yield loss determination 304 of FIG. 3. To determine rare event yield loss, the pin slack and cell delay distributions are determined for each cell at 402 identified (e.g., at 302). The cell delay distribution is separated from pin slack distribution so as to construct a residual distribution at 404. At 406, the rare-event yield loss is determined based at least in part on the delay distribution (d) and the residual distribution (r). In example embodiments, a convolution operation (e.g., integration, as discussed below) is performed between the delay distribution and the residual distribution to compute the rare-event yield loss for any given cell.

Once the residual slack distribution (r) is determined, the original slack distribution (e.g., the slack provided by a timing analysis tool) may be formulated as a statistical addition (e.g., or other appropriate operation) of parameters (d) and (r).

The rare-event yield loss may then be formulated by determining an area under a curve associated with a conditional yield loss probability ($cdf_r$) and a probability of arc at a certain delay ($pdf_d$). In examples, the rare-event yield loss may be represented as a probability distribution according to equation (3) below.

$$P(s<0 \text{ \&\& } d>k) = P(d+r<0 \text{ \&\& } d>k) = \int_k^\infty pdf_d(\tau) \cdot cdf_r(-\tau) d\tau \quad (3)$$

In equation (3), $P(s<0 \text{ \&\& } d>k)$ refers to the joint probability that $s<0$ and $d>k$, where k is a threshold above which the delay distribution is considered a rare event. Furthermore, $P(d+r<0 \text{ \&\& } d>k)$ refers to the probability that $(d+r<0)$ and $d>k$, $pdf_d$ refers to the probability distribution function of the cell delay, $cdf_r$ refers to the cumulative distribution of the residual distribution, and "•" is a convolution operator. In embodiments, convolution refers to an operation on two functions (e.g., here, the conditional yield loss probability and the probability of an arc at a certain delay) that produces a third function that express how the shape of one function is modified by the other.

In one embodiment, the pdf and cdf of equation (3) may have log-normal distributions. In embodiments, the pdf and cdf may be represented according to equations (4) and (5) below.

$$pdf(x) = \frac{1}{x\sigma\sqrt{2\pi}} \exp\left(-\frac{(lnx-\mu)^2}{2\sigma^2}\right) \quad (4)$$

$$cdf(x) = 0.5 + 0.5 * \text{erf}\left(-\frac{lnx-\mu}{\sqrt{2}\,\sigma}\right) \quad (5)$$

In the above equations (4) and (5), parameter x represents process variations contributing to the delay distribution. Once the individual cell rare-event yield loss is determined for each cell of the IC design, they may be aggregated to determine the yield loss across the integrated circuit. In embodiments, aggregating the individual cell rare-event yield losses may be represented according to equation (6).

$$P(s<0 \text{ \&\& } (d_1 > k \text{ or } d_2 > k \text{ or } \ldots d_n > k)) = \sum_{i=1}^{n} P(s<0 \text{ \&\& } d_i > k) \quad (6)$$

It will be appreciated that, in certain embodiments, equation (6) may assume that the cell delay distributions are sampled at high-sigma and are treated as rare-event for that cell. In accordance with embodiments of the present disclosure, yield loss from individual cells are also collected and ranked (e.g., in addition to or in an alternative to providing an aggregated rare-event yield loss for an IC design). The cells contributing the most to the yield loss may be used by embodiments herein (e.g., and/or using an optimization engine or an ECO tool) to mitigate or optimize the yield loss. During such optimizations, for example, high $V_T$ (voltage threshold) cells with large parametric variations may be replaced by low $V_T$ cells with smaller parametric variations.

Figure 5:
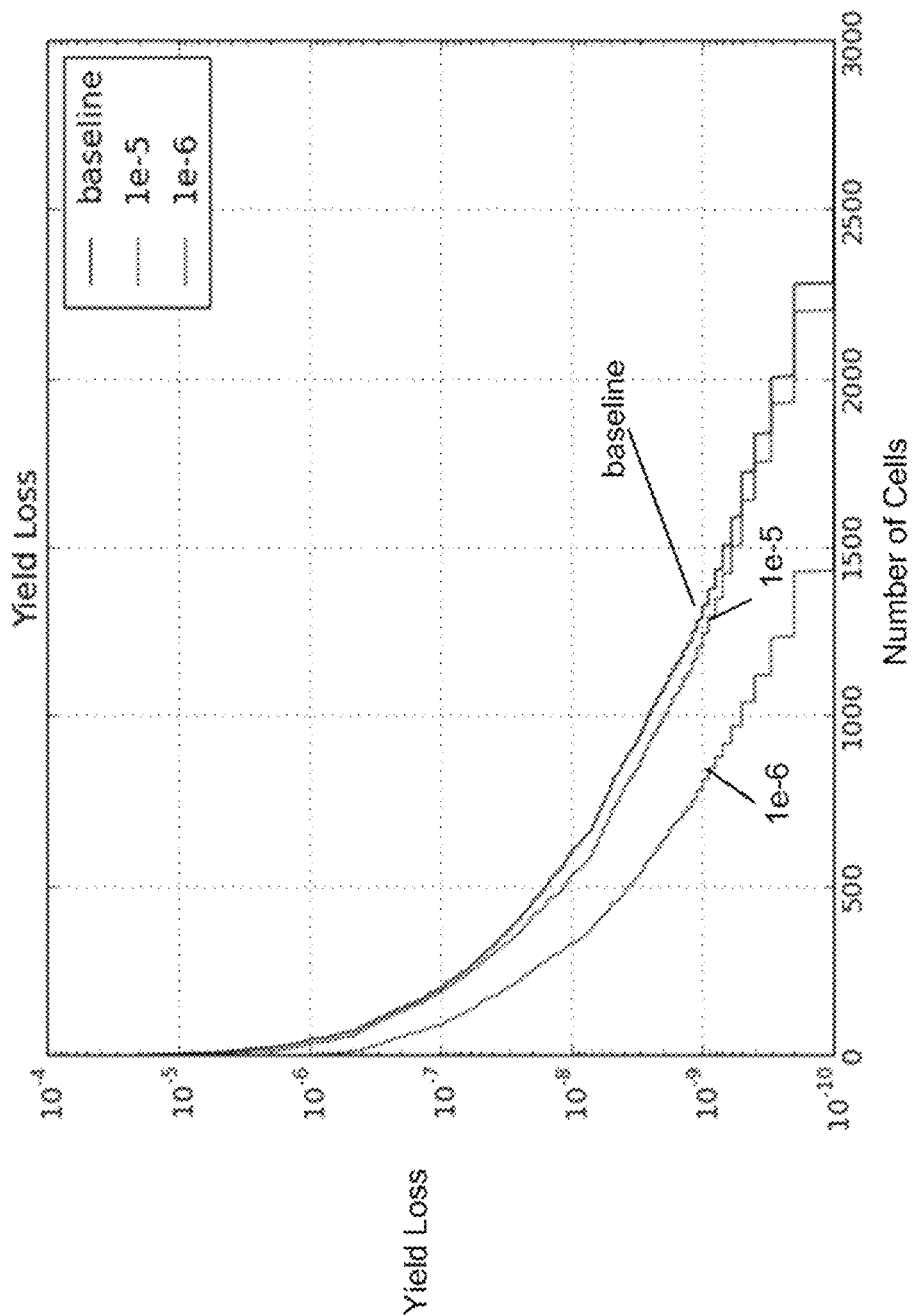
FIG. 5 illustrates exemplary cell high-sigma yield loss recovery results in accordance with some embodiments of the present disclosure.

FIG. 5 illustrates exemplary cell high-sigma yield loss recovery results in accordance with some embodiments of the present disclosure. Using a first design (e.g., Design A), with parameters summarized in Table 2, embodiments herein provided results depicted in Table 3 below. That is, mitigating yield loss according to Table 3 resulted in an improvement in yield loss with no additional area overhead or power overhead.

TABLE 2

| Design A Information | |
| --- | --- |
| Ins. Count | 440,152 |
| Total Power | 3.616e−03 |
| Area | 71,619.53 |

TABLE 3

| Design A Results | | | |
| --- | --- | --- | --- |
| | Baseline | Fix Cells > 1e−5 | Fix Cells > 1e−6 |
| Count | 7,166 | 7 | 50 |
| Worst Yield Loss | 2.53e−05 | 1.27e−05 | 8.70e−07 |
| Total Yield Loss | 2.76e−04 | 1.62e−04 | 3.69e−05 |
| Sizing | X | 7 | 53 |
| Area Overhead | X | 0.0 (0.00%) | 0.0 (0.00%) |
| Power Overhead | X | 1.13e−09 (0.00%) | 1.47e−08 (0.00%) |

Figure 6:
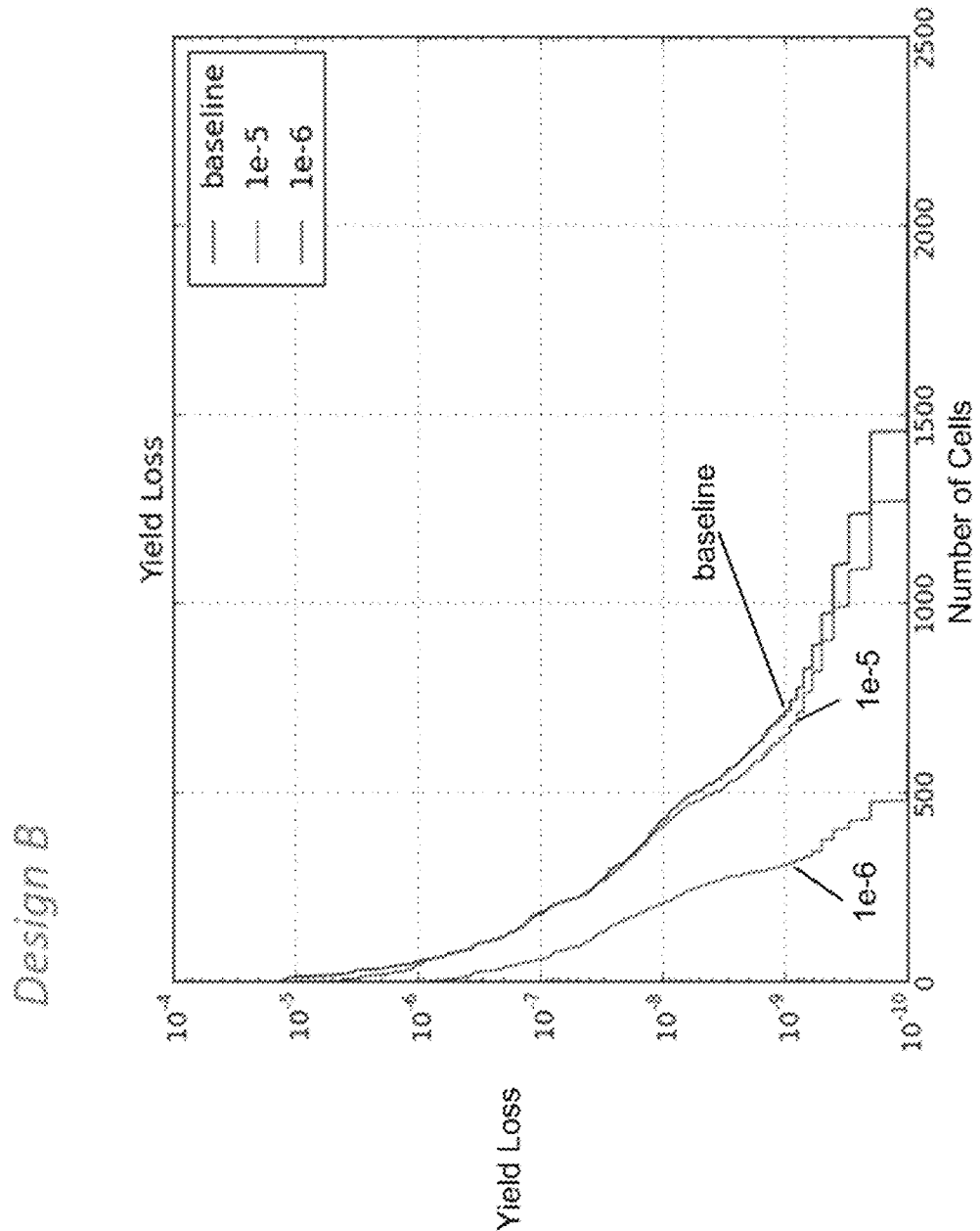
FIG. 6 illustrates exemplary cell high-sigma yield loss recovery results in accordance with some embodiments of the present disclosure.

FIG. 6 illustrates exemplary cell high-sigma yield loss recovery results in accordance with some embodiments of the present disclosure. Using a second design (e.g., Design B), with parameters summarized in Table 4, embodiments herein provided results depicted in Table 5 below. That is, mitigating yield loss according to Table 5 resulted in an improvement in yield loss with no additional area overhead or power overhead.

TABLE 4

| Design B Information | |
| --- | --- |
| Ins. Count | 213,806 |
| Total Power | 9.997e−04 |
| Area | 22,688.68 |

TABLE 5

Design B Results

| | Baseline | Fix Cells > 1e−5 | Fix Cells > 1e−6 |
|---|---|---|---|
| Count | 8,131 | 16 | 56 |
| Worst Yield Loss | 1.47e−05 | 9.47e−06 | 8.42e−07 |
| Total Yield Loss | 3.46e−04 | 1.62e−04 | 2.52e−05 |
| Sizing | X | 16 | 56 |
| Area Overhead | X | 0.0 (0.00%) | 0.0 (0.00%) |
| Power Overhead | X | 8.40e−10 (0.00%) | 1.39e−09 (0.00%) |

Figure 7:
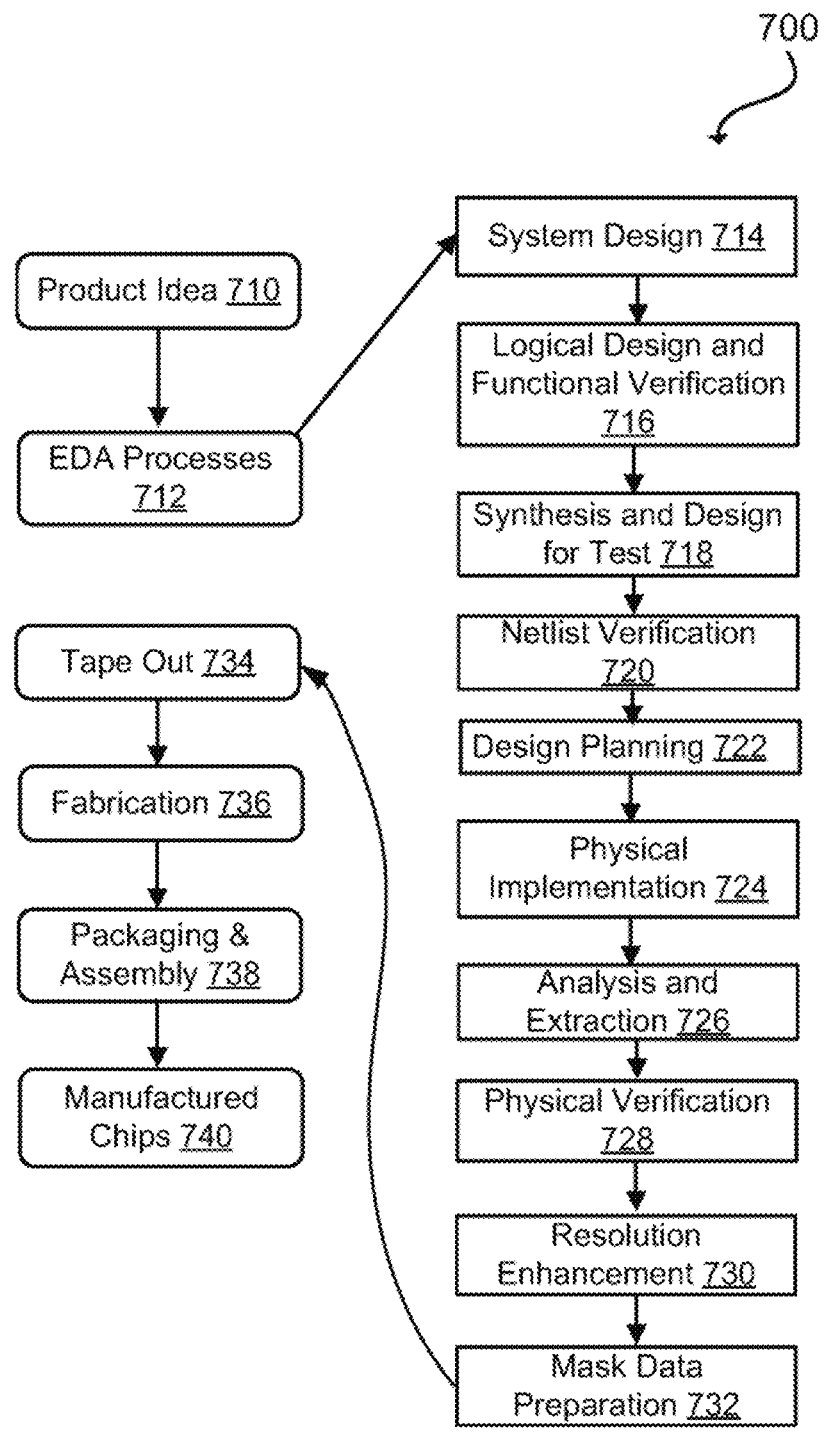
FIG. 7 depicts a flowchart of various processes used during the design and manufacture of an integrated circuit in accordance with some embodiments of the present disclosure.

FIG. 7 illustrates an example set of processes 700 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 710 with information supplied by a designer, information which is transformed to create an article of manufacture that uses a set of EDA processes 712. When the design is finalized, the design is taped-out 734, which is when artwork (e.g., geometric patterns) for the integrated circuit is sent to a fabrication facility to manufacture the mask set, which is then used to manufacture the integrated circuit. After tape-out, a semiconductor die is fabricated 736 and packaging and assembly processes 738 are performed to produce the finished integrated circuit 740.

Specifications for a circuit or electronic structure may range from low-level transistor material layouts to high-level description languages. A high-level of abstraction may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which is used for detailed descriptions of circuits with many analog components. Descriptions at each level of abstraction are enabled for use by the corresponding tools of that layer (e.g., a formal verification tool). A design process may use a sequence depicted in FIG. 7. The processes described by be enabled by EDA products (or tools).

During system design 714, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 716, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 718, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 720, the netlist is checked for compliance with timing constraints and for correspondence with the HDL code. During design planning 722, an overall floor plan for the integrated circuit is constructed and analyzed for timing and top-level routing.

During layout or physical implementation 724, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 726, the circuit function is verified at the layout level, which permits refinement of the layout design. During physical verification 728, the layout design is checked to ensure that manufacturing constraints are correct, such as DRC constraints, electrical constraints, lithographic constraints, and that circuitry function matches the HDL design specification. During resolution enhancement 730, the geometry of the layout is transformed to improve how the circuit design is manufactured.

During tape-out, data is created to be used (after lithographic enhancements are applied if appropriate) for production of lithography masks. During mask data preparation 732, the 'tape-out' data is used to produce lithography masks that are used to produce finished integrated circuits.

A storage subsystem of a computer system (e.g., such as computer system 900 of FIG. 8) may be used to store the programs and data structures that are used by some or all of the EDA products described herein, and products used for development of cells for the library and for physical and logical design that use the library.

Figure 8:
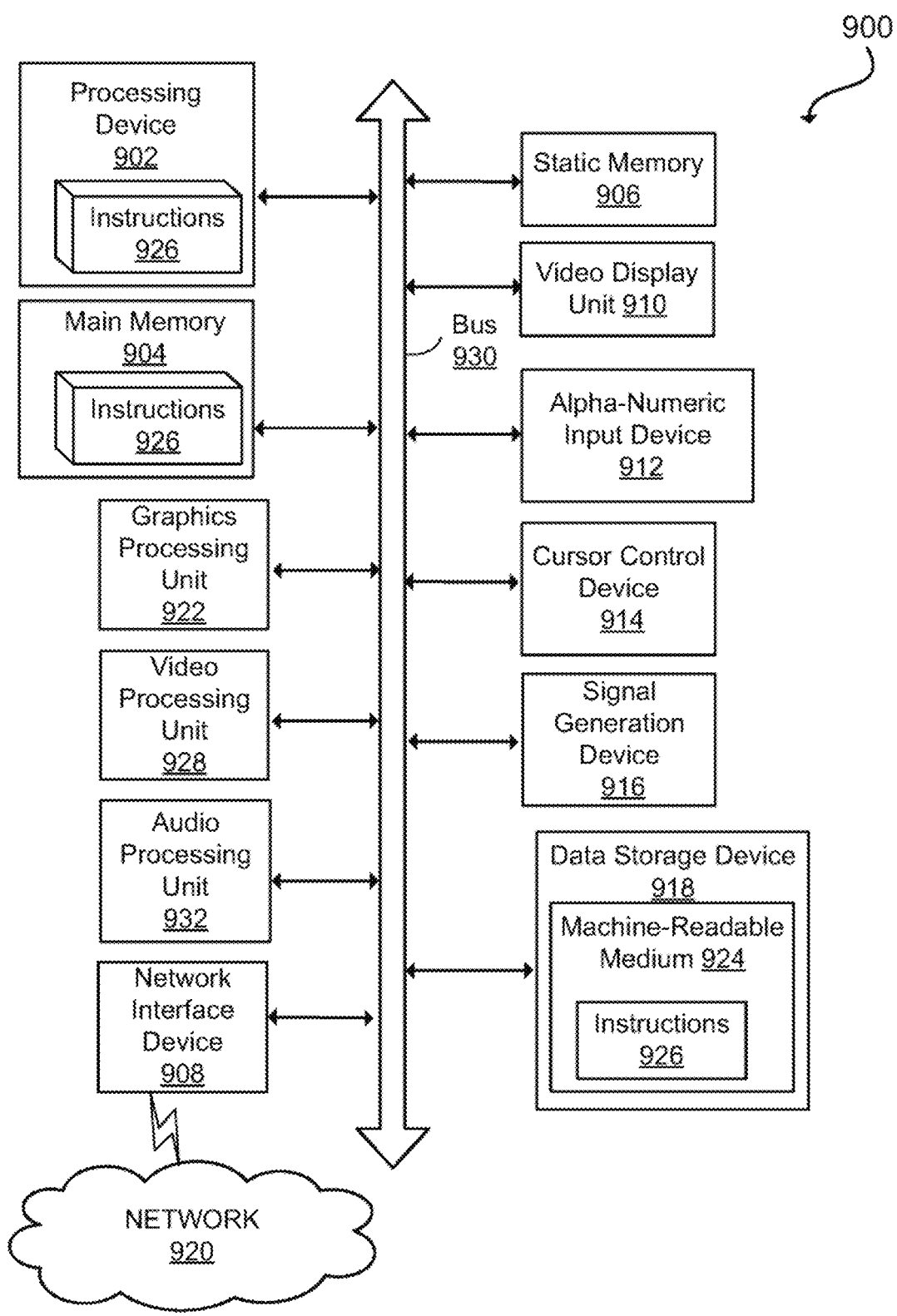
FIG. 8 depicts an abstract diagram of an example computer system in which embodiments of the present disclosure may operate.

FIG. 8 illustrates an example machine of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed)

network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM), a static memory 906 (e.g., flash memory, static random access memory (SRAM), etc.), and a data storage device 918, which communicate with each other via a bus 930.

Processing device 902 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 may be configured to execute instructions 926 for performing the operations and steps described herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a non-transitory computer-readable medium) on which is stored one or more sets of instructions 926 or software embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In some implementations, the instructions 926 include instructions to implement functionality corresponding to the present disclosure. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 902 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method of mitigating parametric yield loss of an integrated circuit (IC) design, the method comprising:
    determining, a delay distribution associated with at least one cell disposed in the design;
    determining, a pin slack distribution associated with pins associated with paths in which the at least one cell is disposed;
    determining, a residual distribution based at least in part on the delay distribution and the pin slack distribution;
    determining, using a processor, yield loss associated with the at least one cell based at least in part on the delay distribution and the residual distribution; and
    upon determining that the yield loss associated with the at least one cell exceeds a yield loss threshold, providing an indication of the at least one cell as a candidate for replacement with a replacement cell.

2. The method of claim 1, wherein determining the yield loss comprises performing a convolution operation on the delay distribution and the residual distribution.

3. The method of claim 1, wherein determining the residual distribution comprises subtracting a conjugate of the delay distribution from the pin slack distribution.

4. The method of claim 3, wherein the delay distribution comprises a first log-normal distribution.

5. The method of claim 3, wherein the residual distribution comprises a second log-normal distribution.

6. The method of claim 1, further comprising:
    determining an aggregated yield loss for the integrated circuit (IC) design based on aggregating yield losses associated with each cell of a plurality of cells of the IC design.

7. The method of claim 1, further comprising:
    determining yield loss for a plurality of cells of the integrated circuit (IC) design; and
    ranking each cell of the plurality of cells according to its associated yield loss in relation to other cells of the plurality of cells.

8. The method of claim 7, further comprising:
    identifying a top N number of cells of the plurality of cells having higher yield loss in relation to other cells of the plurality of cells; and
    provide a second indication of the top N number of cells of the plurality of cells as candidates for replacement with replacement cells associated with less parametric variation than the top N number of cells.

9. A system, comprising:
    a memory storing instructions; and
    a processor, coupled with memory and to execute the instructions, the instructions when executed cause the processor to:
    determine a delay distribution associated with at least one cell disposed in the design;
    determine a pin slack distribution associated with pins associated with paths in which the at least one cell is disposed;
    determine a residual distribution based at least in part on the delay distribution and the pin slack distribution;
    determine yield loss associated with the at least one cell based at least in part on the delay distribution and the residual distribution; and
    upon determining that the yield loss associated with the at least one cell exceeds a yield loss threshold, provide an indication of the at least one cell as a candidate for replacement with a replacement cell.

10. The system of claim 9, wherein determining the yield loss comprises performing a convolution operation on the delay distribution and the residual distribution.

11. The system of claim 9, wherein determining the residual distribution comprises subtracting a conjugate of the delay distribution from the pin slack distribution.

12. The system of claim 11, wherein the delay distribution comprises a first log-normal distribution.

13. The system of claim 12, wherein the residual distribution comprises a second log-normal distribution.

14. The system of claim 9, wherein the instructions, when executed by the processor, further cause the processor to:
    determine an aggregated yield loss for the integrated circuit (IC) design based on aggregating yield losses associated with each cell of a plurality of cells of the IC design.

15. The system of claim 9, wherein the instructions, when executed by the processor, further cause the processor to:
    determine yield loss for a plurality of cells of the integrated circuit (IC) design; and
    rank each cell of the plurality of cells according to its associated yield loss in relation to other cells of the plurality of cells.

16. The system of claim 15, wherein the instructions, when executed by the processor, further cause the processor to:
    identify a top N number of cells of the plurality of cells having higher yield loss in relation to other cells of the plurality of cells; and
    provide a second indication of the top N number of cells of the plurality of cells as candidates for replacement with replacement cells associated with less parametric variation than the top N number of cells.

17. A non-transitory computer readable medium comprising stored instructions, which when executed by a processor, cause the processor to:
    determine a delay distribution associated with at least one cell disposed in the design;
    determine a pin slack distribution associated with paths in which the at least one cell is disposed;
    determine a residual distribution based at least in part on the delay distribution and the pin slack distribution;
    determine yield loss associated with the at least one cell based at least in part on the delay distribution and the residual distribution; and
    upon determining that the yield loss associated with the at least one cell exceeds a yield loss threshold, provide an indication of the at least one cell as a candidate for replacement with a replacement cell.

18. The computer readable medium of claim 17, wherein the stored instructions, when executed by the processor, further cause the processor to:

determine an aggregated yield loss for the integrated circuit (IC) design based on aggregating yield losses associated with each cell of a plurality of cells of the IC design.

19. The computer readable medium of claim 17, wherein the stored instructions, when executed by the processor, further cause the processor to:
    determine yield loss for a plurality of cells of the integrated circuit (IC) design; and
    rank each cell of the plurality of cells according to its associated yield loss in relation to other cells of the plurality of cells.

20. The computer readable medium of claim 19, wherein the stored instructions, when executed by the processor, further cause the processor to:
    identify a top N number of cells of the plurality of cells having higher yield loss in relation to other cells of the plurality of cells; and
    provide a second indication of the top N number of cells of the plurality of cells as candidates for replacement with replacement cells associated with less parametric variation than the top N number of cells.

\* \* \* \* \*